United States Patent
Graham et al.

[11] Patent Number: 5,964,927
[45] Date of Patent: *Oct. 12, 1999

[54] ADSORPTION APPARATUS

[75] Inventors: Kristine M. Graham, Minnetonka; Paul Peterson, New Prague; Donald R. Monson, West St. Paul; Jarren B. Mills, Apple Valley; Timothy H. Grafe, Edina, all of Minn.

[73] Assignee: Donaldson Company, Inc., Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/890,804

[22] Filed: Jul. 11, 1997

[51] Int. Cl.⁶ .................................................. B01D 53/04
[52] U.S. Cl. ................................ 96/121; 96/129; 96/151; 96/152; 55/518
[58] Field of Search .................... 55/502, 518, 515–517; 96/121, 129, 130, 135–141, 117.5, 417

[56] References Cited

U.S. PATENT DOCUMENTS

| | | | |
|---|---|---|---|
| 2,055,774 | 9/1936 | Ray | 96/129 |
| 2,579,477 | 12/1951 | Dauphinee | 96/129 |
| 2,764,251 | 9/1956 | Jessop | 96/137 |
| 2,881,854 | 4/1959 | Uehre, Jr. | 96/138 |
| 3,243,942 | 4/1966 | Burke | 96/129 |
| 3,344,590 | 10/1967 | Smith et al. | 55/516 X |
| 3,350,860 | 11/1967 | Grassel et al. | 55/518 X |
| 3,354,623 | 11/1967 | Keller | 55/518 X |
| 3,411,273 | 11/1968 | Duncan et al. . | |
| 3,581,476 | 6/1971 | Rivers | 96/129 |
| 3,853,519 | 12/1974 | York, Jr. | 96/129 |
| 3,861,894 | 1/1975 | Marsh | 96/121 |
| 3,912,472 | 10/1975 | Marble | 55/515 X |
| 3,961,920 | 6/1976 | Gilbert | 96/129 |
| 4,049,406 | 9/1977 | Rivers | 96/129 |
| 4,135,896 | 1/1979 | Parish et al. | 96/129 |
| 4,216,003 | 8/1980 | Diachuk | 55/518 X |
| 4,292,059 | 9/1981 | Kovach | 96/121 |
| 4,486,204 | 12/1984 | Marijnissen et al. | 96/121 |
| 4,749,390 | 6/1988 | Burnett et al. | 96/138 X |
| 4,787,922 | 11/1988 | Kulitz | 96/121 X |
| 4,969,936 | 11/1990 | Schweigert et al. | 96/129 |
| 5,064,453 | 11/1991 | Jacquish | 96/130 X |
| 5,080,699 | 1/1992 | Ho et al. . | |
| 5,290,345 | 3/1994 | Osendorf et al. | 96/129 |
| 5,302,354 | 4/1994 | Watvedt et al. . | |
| 5,514,205 | 5/1996 | Awaji | 55/516 X |
| 5,593,481 | 1/1997 | Redner | 96/138 X |
| 5,685,895 | 11/1997 | Hagiwara et al. | 96/117 |
| 5,733,350 | 3/1998 | Muller et al. . | |

FOREIGN PATENT DOCUMENTS

| | | | |
|---|---|---|---|
| 0 457 402 | 11/1991 | European Pat. Off. . | |
| 2548040 | 1/1985 | France | 96/121 |
| 31 29 384 | 2/1983 | Germany . | |
| 1-063014 | 3/1989 | Japan | 96/136 |
| 0874136 | 10/1981 | Russian Federation | 96/121 |
| 1333383 | 8/1987 | Russian Federation | 96/130 |
| 1 466 713 | 3/1977 | United Kingdom . | |

*Primary Examiner*—Robert Spitzer
*Attorney, Agent, or Firm*—Merchant & Gould P.C.

[57] ABSTRACT

An adsorption apparatus has a housing including an inlet and an outlet, and defining an inlet plenum extending vertically below the inlet and an outlet plenum extending vertically below the outlet. A plurality of adsorption bed assemblies in a vertically stacked configuration are retained in the housing in fluid communication with the inlet plenum. Each of the adsorption bed assemblies has a bottom opening and a top opening and layers of adsorption material with the assembly oriented in a V-type configuration. A plurality of baffles angle upward from the inlet plenum to the outlet plenum, including a baffle disposed between each pair of adjacent stacked adsorption bed assemblies, to direct flow up toward the bottom opening of the adsorption bed assembly immediately above the baffle and to direct flow passing from the top opening of the adsorption bed assembly immediately below the baffle.

18 Claims, 9 Drawing Sheets

ADSORPTION APPARATUS

BACKGROUND

1. Field of the Invention

The present invention relates to an adsorption bed and adsorption filtering system for removing airborne contaminants from clean rooms, sick buildings, or other enclosed spaces.

2. Prior Art

Gas adsorption beds are used in many industries to remove airborne contaminants, such as organic bases, to protect people, the environment and often, a critical manufacturing process or the products that are manufactured. A specific example of an application for gas adsorption beds is the semiconductor industry where products are manufactured in an ultra-clean environment, commonly known in the industry as a "clean room". The manufacturing processes typically require the use of substances such as solvents to be used in the clean room environment. The use of these substances presents a problem because vapors that are present or are a byproduct from the process may contaminate the air and other processes in the room if not properly removed. In addition, environments may have several gases occurring naturally in the ambient air that contaminants that cannot be removed by particulate filters.

Typical contaminants are airborne bases, such as ammonia, organic amines, and N-Methyl-2-Pyrrolidone. To eliminate the problem, contaminated air is often drawn through a granular adsorption bed assembly having a frame and an adsorption medium, such as activated carbon, retained within the frame. The adsorption medium adsorbs or chemically reacts with the gaseous contaminants from the air flow and allows clean air to be returned to the process and/or the clean room. The removal efficiency is critical in order to protect the processes and the products. The removal efficiency and capacity of the gaseous adsorption bed is dependent upon a number of factors, such as the air velocity through the adsorption bed, the depth of the bed, the type and amount of the adsorption medium being used and the activity level and rate of the adsorption medium. It is also important that for efficiency to be increased, the air leaking through voids between the tightly packed adsorption bed granules and the frame should be eliminated.

Moreover, it is also important to have balanced flow distribution should more than one bed be used in parallel, so that all the beds can be changed at substantially the same interval while achieving a long life span for each bed. If flow is not distributed evenly, certain beds must be replaced before they are fully spent in order to maintain an acceptable safety factor. Moreover, it is important to accurately predict the adsorption activity of a bed that is typical of the deterioration rate of the active adsorption medium in the adsorption beds.

An example of such an adsorption bed and system is shown in U.S. Pat. No. 5,290,345, to Osendorf et al., and assigned to Donaldson Company, Inc., the Assignee of the present invention. Although the Osendorf patent shows beds which overcome the problems stated above, further improvements are possible.

It can be appreciated that if a measuring system could be utilized that uses a deterioration rate comparable to the adsorption beds, it can be reliably predicted when the beds will be spent. It can be appreciated that to maximize efficiency, even flow distribution should be accomplished with minimal pressure drop. The flow path along edges of adsorption medium in the beds should be longer to compensate for voids at the edges. Moreover, the footprint and space required for the adsorption beds and related flow distribution should be minimized. Such a system should provide a modular configuration for stacking of beds vertically and horizontally with easy removal and insertion and reliable sealing. The present invention addresses these as well as other problems related to adsorption systems.

SUMMARY OF THE INVENTION

The present invention is directed to an adsorptive filtering device and in particular to an adsorptive device that provides for balanced distribution through adsorptive beds, increased life and improved efficiency.

The present invention contemplates a modular system which provides for vertical as well as horizontal stacking of individual adsorptive beds. The adsorptive beds are cartridge-type elements which include an internal arrangement of individual adsorption filtering elements. Modules can also be connected in a side-by-side arrangement.

Each adsorption module includes an inlet plenum and an outlet plenum with a vertical stack of adsorption beds exposed therebetween. The inlet and outlet plenums are arranged in a substantially vertical configuration with the flow entering and leaving from the top of the plenums. The cross sectional areas of the plenums are designed with a ratio such that flow is distributed in a balanced manner to each of the adsorption beds. A single access door extends along the front of the module.

The adsorption bed stack includes frame elements which support each of the adsorption bed assemblies. The frame includes side panels which seal to the housing of the module and also support a baffle. The baffles are disposed between vertically adjacent adsorption bed assemblies and act to direct air into the bottom of an adsorption bed assembly immediately above the baffle and to direct air outward from an adsorption bed assembly immediately below the baffle. Each frame section includes a support to maintain the baffles at an angle. Inlet and outlet vents direct flow transversely along the width of the adsorption bed assembly. A honeycomb grid member inserts below the adsorption bed assembly and above the baffle and directs the air substantially straight upward and provides proper orientation of the air engaging the individual adsorption bed elements in the adsorption bed assemblies. The space between the baffle and the adsorption bed assembly is such that the flow is distributed substantially evenly from front to back along the adsorption bed. An inflatable gasket in fluid communication with a compressed air supply seals to the planar top of the adsorption bed assembly. It can be appreciated that each adsorption bed assembly inserts through an opening in the front of each frame section and the single door serving all adsorption bed assemblies along the front of each module. The gasket provides a seal to the downstream clean air side of the adsorption bed. After passing through each adsorption bed assembly, air strikes the bottom of the baffle, which directs the air rearward to the outlet plenum where it passes upward through the top of each module.

Each adsorption bed assembly includes a housing having a planar top and bottom. Openings are formed in the top and bottom that allow air flow through adsorption bed elements within the housing. The upper surface includes a single planar member with flanges bent down to form openings. Within the housing are disposed rectangular adsorption beds which include a mesh screen retaining activated carbon or other adsorptive materials therebetween. The mesh screens include channel members extending around the periphery of each element which are potted to the ends of the inside of the housing. The screens also include a center post which prevents the screens from bowing outward under pressure. The channels at the edge of the element have a midbed baffle which extends inward into the adsorptive material. The baffle ensures that voids at the edge of the medium do not decrease the efficiency of the bed as the length of the path for gases passing along the edge are increased by the baffle extending inward. Similarly, the post at the center may include a flange extending transversely to the post to increase the length of the path of air passing along the center post. Each element also includes a pre-filter and post-filter, typically an electrostatic type filter for retaining particles from the adsorptive material. The adsorption elements are arranged in a V-type cross-sectional configuration which provides for even distribution and pressure drop for each individual element.

These features of novelty and various other advantages which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

Referring now to the drawings, wherein like reference numerals and letters indicate corresponding structure throughout the several views.

DETAILED DESCRIPTION OF THE PREFERRED EMBODIMENT

Figure 1:
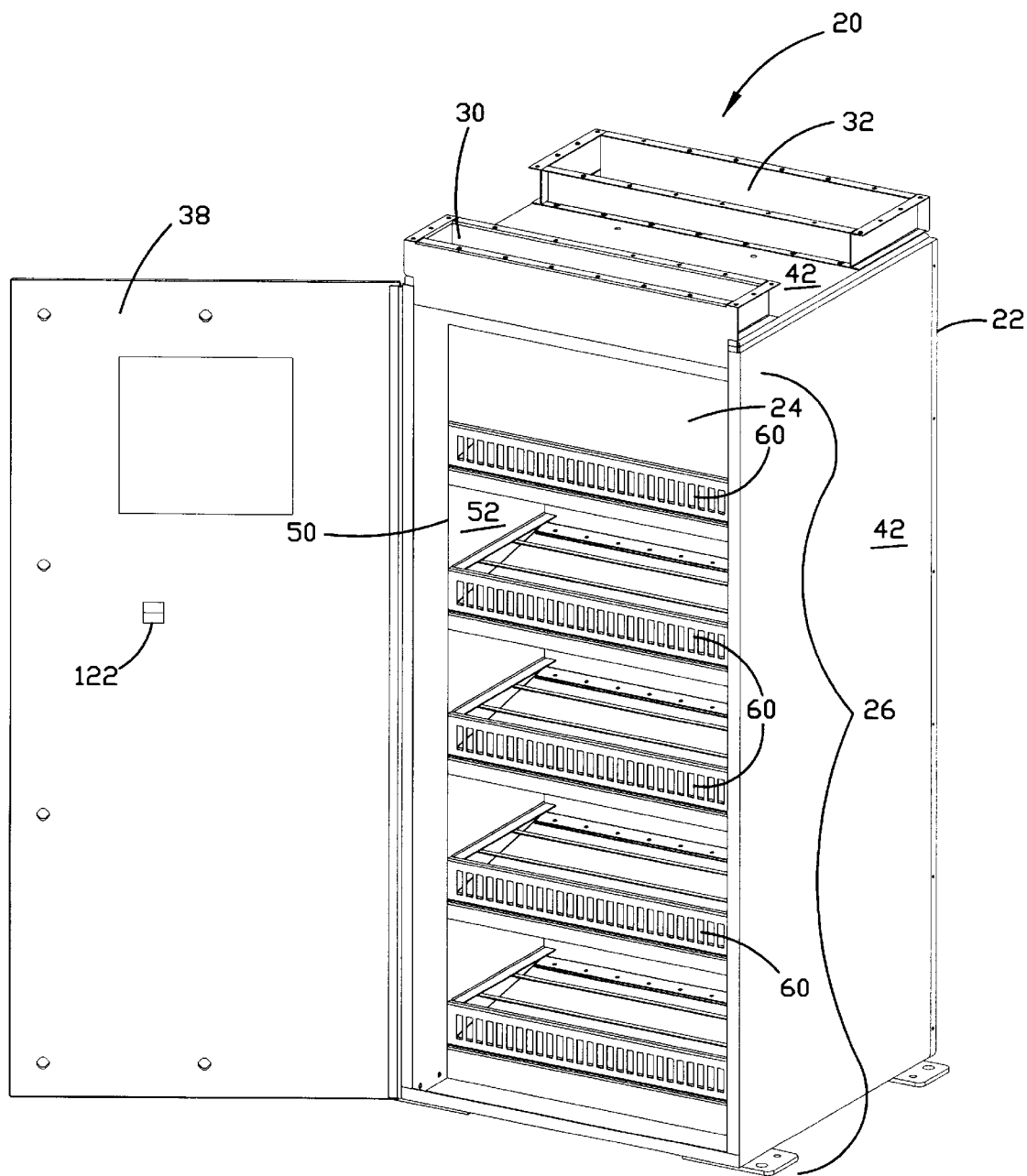
FIG. 1 shows a perspective view of an adsorption filtering system according to the principles of the present invention.
Figure 2:
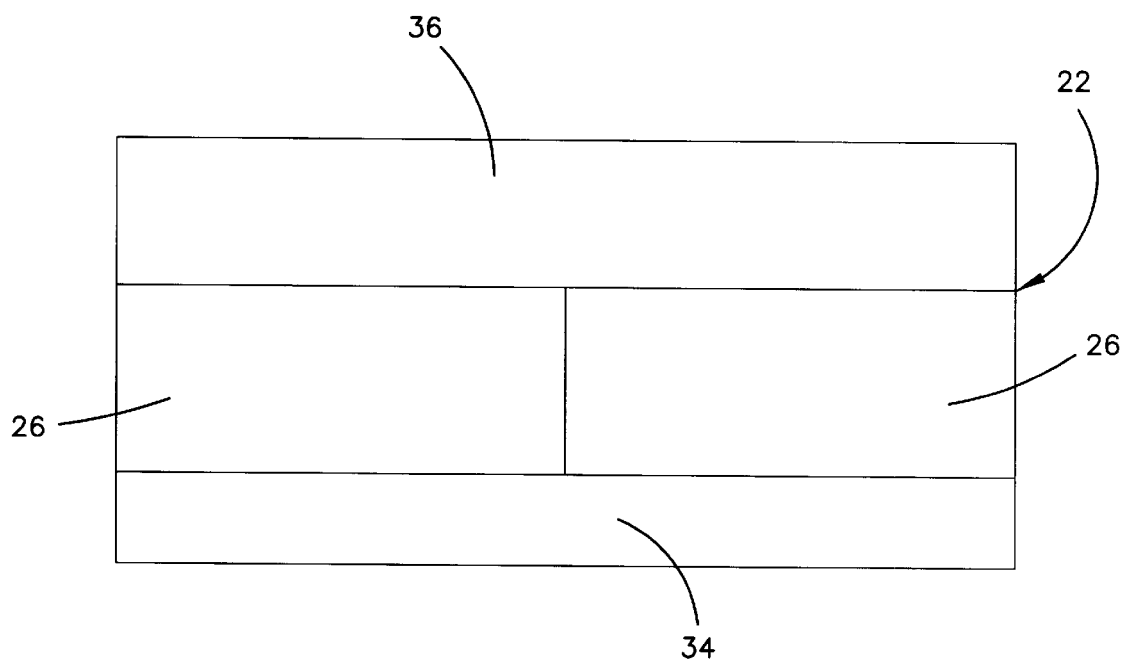
FIG. 2 shows a top plan view of an adsorptive system having two vertical stacks.

Referring now to the drawings, and in particular to FIG. 1, there is shown a counter flow adsorption module 22 of an adsorptive filtering system 20. The modules 22 can be joined together to form a higher capacity adsorptive system 20, as shown in FIG. 2. The system 20 of the present invention provides for a plurality of cartridge-type adsorption bed assemblies 24 receiving parallel flow with both vertical stacking shown most clearly in FIG. 1, as well as horizontal stacking, as shown in FIG. 2. With the present configuration, the height and width of the number of adsorption bed assemblies 24 can be designed to accommodate the filter and flow requirements of each particular system.

Referring again to FIG. 1, each module 22 includes an inlet 30 and an outlet 32 having flanges formed thereon for accepting a gasket and providing a sealed connection to upstream and downstream duct work. The counter flow adsorption module 22 includes an access door 38 pivoting along one vertical edge in a preferred configuration. A housing is formed of sealed housing panels 42, forming a sealed enclosure with air escaping only through the inlet 30 and outlet 32. The access door 38 also includes gaskets for an enclosed air tight housing.

Figure 3:
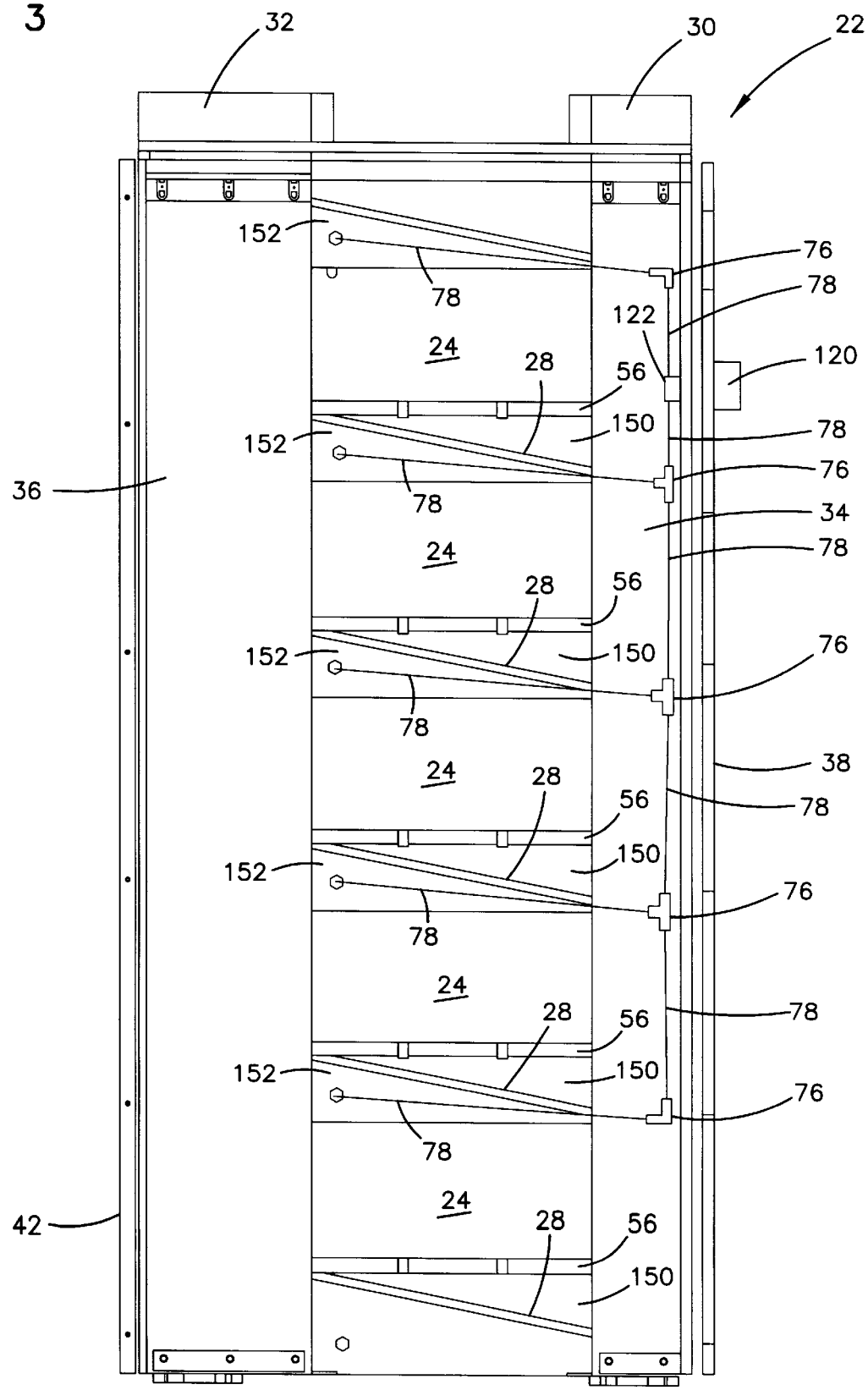
FIG. 3 shows a side sectional view of the adsorptive system shown in FIG. 1.

Referring now to FIG. 3, each counter flow adsorption module 22 supports a stack of the adsorption bed assemblies 24. A corresponding number of adsorption bed assembly support frame sections 50 (FIG. 1) are stacked in a vertical configuration to form a frame 26 (FIG. 1) within the counter flow adsorption bed module 22. The adsorption bed assembly support frame 26 can be stacked in any height corresponding to the desired number of adsorption bed assemblies 24 that are to be used.

Extending vertically below the inlet 30 is an inlet plenum 34. Extending vertically below the outlet 32 is an outlet plenum 36. To provide for balanced distribution of flow between the multiple adsorption bed assemblies 24, the ratio of the cross sectional area of the inlet plenum 34 to the cross-sectional area of the outlet plenum 36 is 0.636. It has been found that such a ratio produces balanced flow between the various adsorption bed assemblies 24. In this manner, the activated carbon or other adsorption material in each adsorption bed assembly 24 deteriorates at the same rate. As the inlet 30 and outlet 32 are both on the top, air flow is downward through the inlet plenum 34 and counterflow upward through the adsorption bed assemblies 24 and in the outlet plenum 36.

Figure 4:
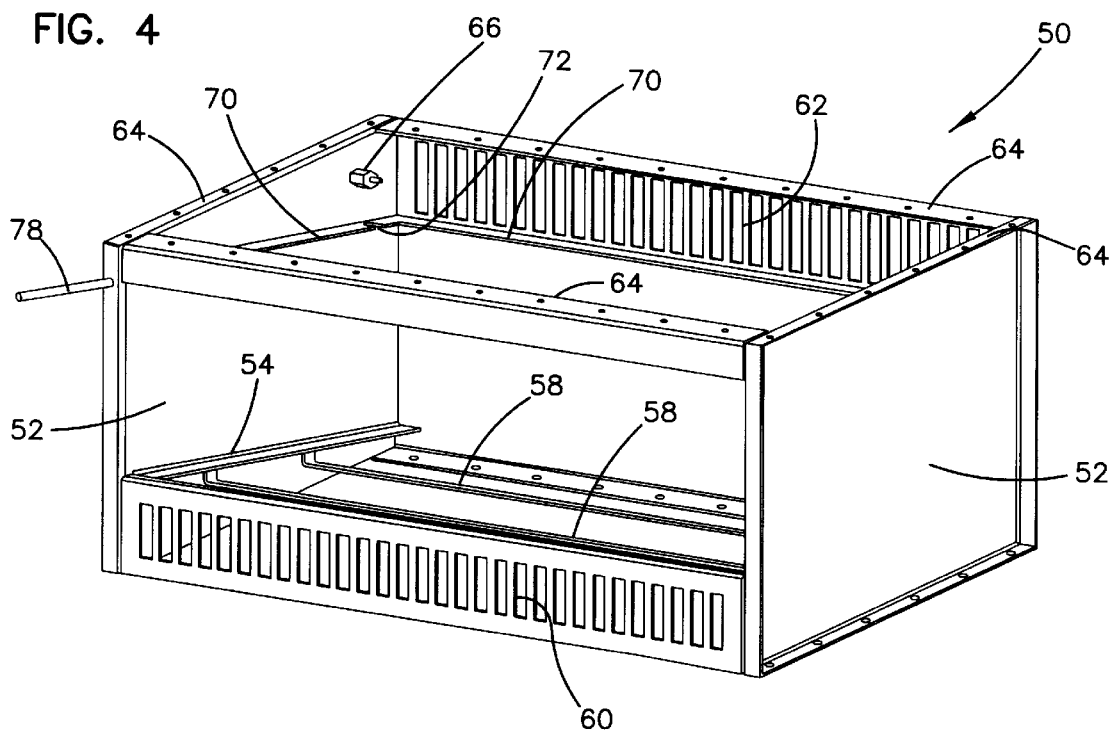
FIG. 4 shows a perspective view of a frame section.
Figure 5:
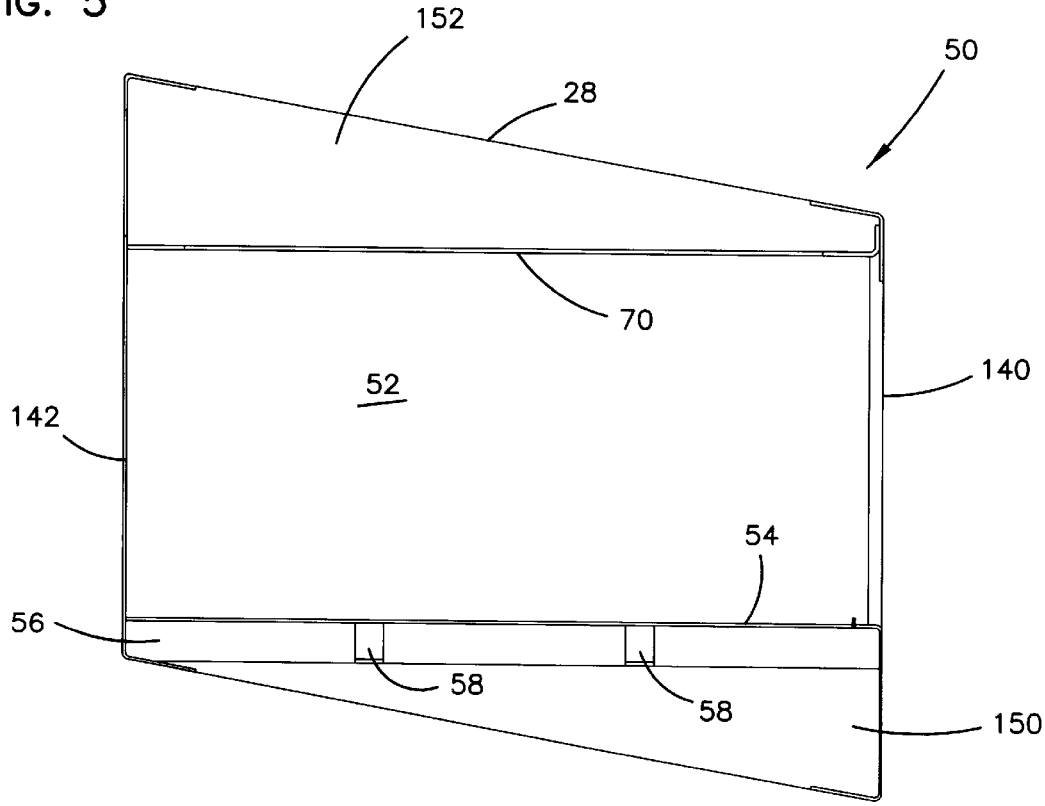
FIG. 5 shows a side sectional view of a frame section shown in FIG. 4.

Referring now to FIG. 4, there is shown an individual adsorption bed frame section 50. The frame section 50 includes planar side panels 52 having substantially opposed parallelogram shaped sides 52. The frame sections 50 are configured so that the vertical edges of sides 52 extend substantially vertically while the top and bottom edges are angled upward from front to rear, for receiving baffles and directing flow through the adsorption bed assemblies 24, as explained hereinafter. Support members 58 extend parallel to a front portion 140 of the frame section 50. The supports 58 support a honeycomb panel 56, as shown in FIG. 5. A honeycomb panel 56 is a planar member having hexagonal orifices formed therein in a honeycomb-like grid. Such a honeycomb panel 56 maintains flow upward and aids in balanced distribution into the adsorption bed assemblies 24, as explained hereinafter. The honeycomb panel supports 58 extend below flanges 64 and bed supports 54. The bed supports 54 extend inward from each of the sides 52 and support an adsorption bed assembly 24.

At the front face 140 of the frame section 50 is an inlet register 60 having a plurality of orifices formed therein which are spaced evenly apart for directing air evenly across an adsorption bed inlet chamber 150 intermediate the top of a baffle 28 and a lower surface of an adsorption bed assembly 24. It can be appreciated that the adsorption bed inlet chamber 150 narrows from front to rear and aids in even distribution of the air flow from front to rear into the adsorption bed assembly. In a similar but opposite configuration, at a rear face 142 of each frame section 50, is an outlet register 62 having a plurality of orifices spaced evenly apart thereon. The space between the bottom of a baffle 28 and the upper portion of an adsorption bed assembly 24 forms an outlet chamber 152 which increases in height from front to rear. The configuration of the inlet chamber 150 and outlet chamber 152 provides for counter flow from below and up through an adsorption bed assembly 24, as well as from front to rear from the inlet 30 and the inlet plenum 34, to the outlet 32 and the outlet plenum 36, as shown for example in FIG. 3.

Referring again to FIGS. 4 and 5, each frame section includes flanges 64 which attach to the baffle 28 (FIG. 3) and adjacent upper and lower frame sections 50. It can be appreciated that the seals and gaskets are used to ensure sealed air flow. It can be appreciated that with the sealed flow path and solid sides 52, all air is directed through the inlet and outlet registers 60 and 62 and through the adsorption bed assembly 24.

Figure 9:
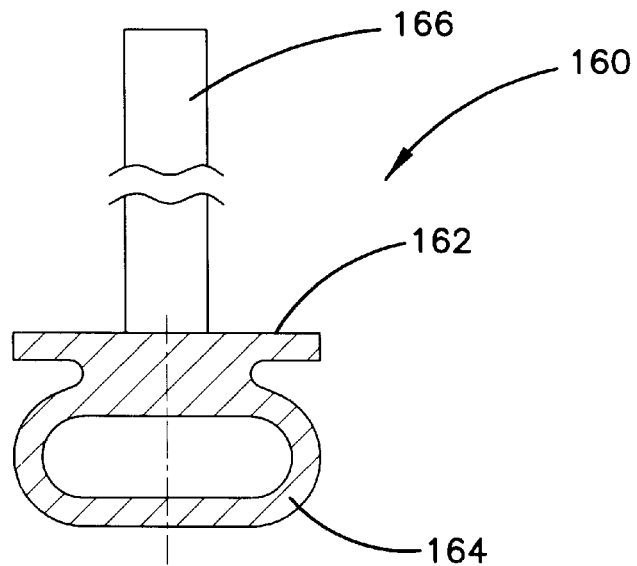
FIG. 9 shows a sectional view of the gasket for a frame module in a deflated state.
Figure 10:
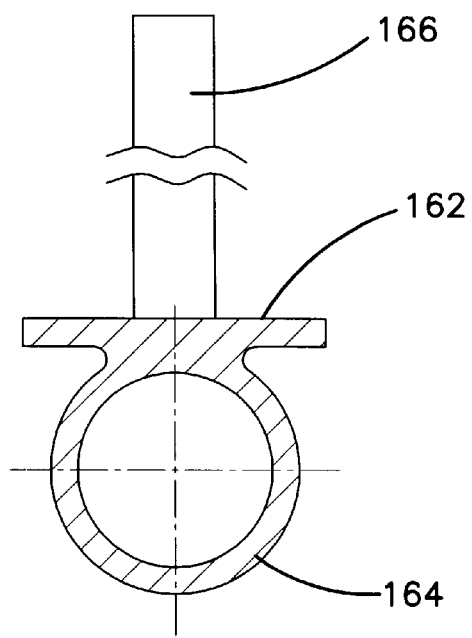
FIG. 10 shows a sectional view of the gasket for the frame module shown in FIG. 9 in an inflated state.

To ensure that air does not leak around the adsorption bed assemblies 24, an inflatable gasket 160 is used with each frame section 50, as shown in FIGS. 9 and 10. The inflatable gasket 160 mounts below the flange 70 along a flat upper face 162. The gasket 160 is rectangular generally corresponding to the outline to the shape of the rectangular flange 70. The gasket 160, having an oblong inflatable cross section 164 when uninflated, as shown in FIG. 9, extends downward when inflated, as shown in FIG. 10, to engage the top of an adsorption bed assembly 24, as explained hereinafter to form an air tight seal. A stem 166 extends up to a fitting 66, as shown in FIG. 4. It can be appreciated that by sealing on the top of an adsorption bed assembly 24, the seal is made on the downstream or filtered clean air side. This configuration assures that no contaminants pass downstream on the clean air side.

The flange 70 includes a notch 72 for receiving the stem 166 leading to the fitting 66 mounted on one side 52. An air line 78 extends on the outside of the side 52 from the fitting 66 through an orifice in the front face 140 of the flange 64. The air line 78 leads to a vertically extending portion of the air line 78 with flow extending through tees and other fittings 76 providing pressurized air to the inflatable gaskets 160.

Figure 6:
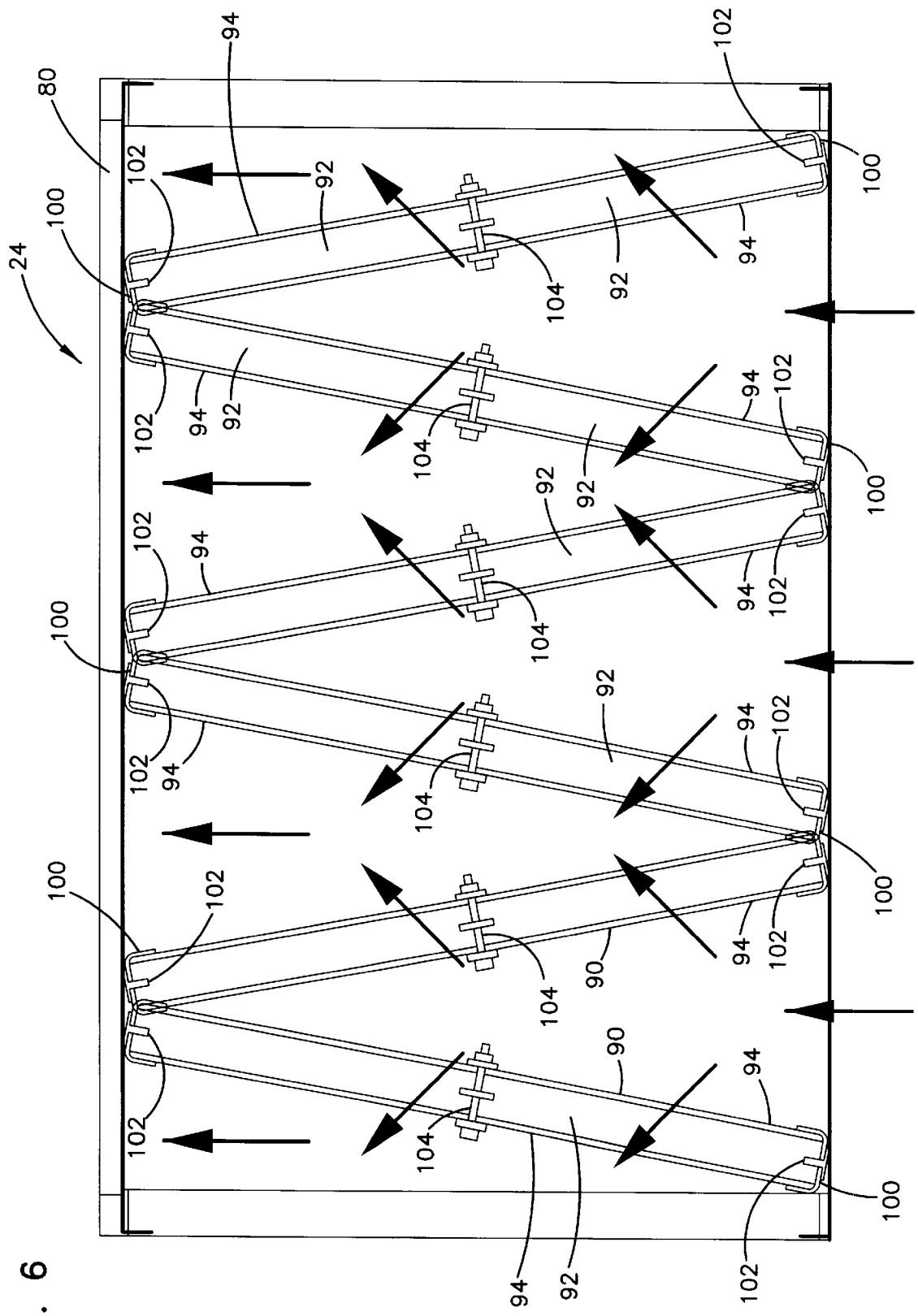
FIG. 6 shows a side sectional view of an adsorptive bed assembly.
Figure 7:
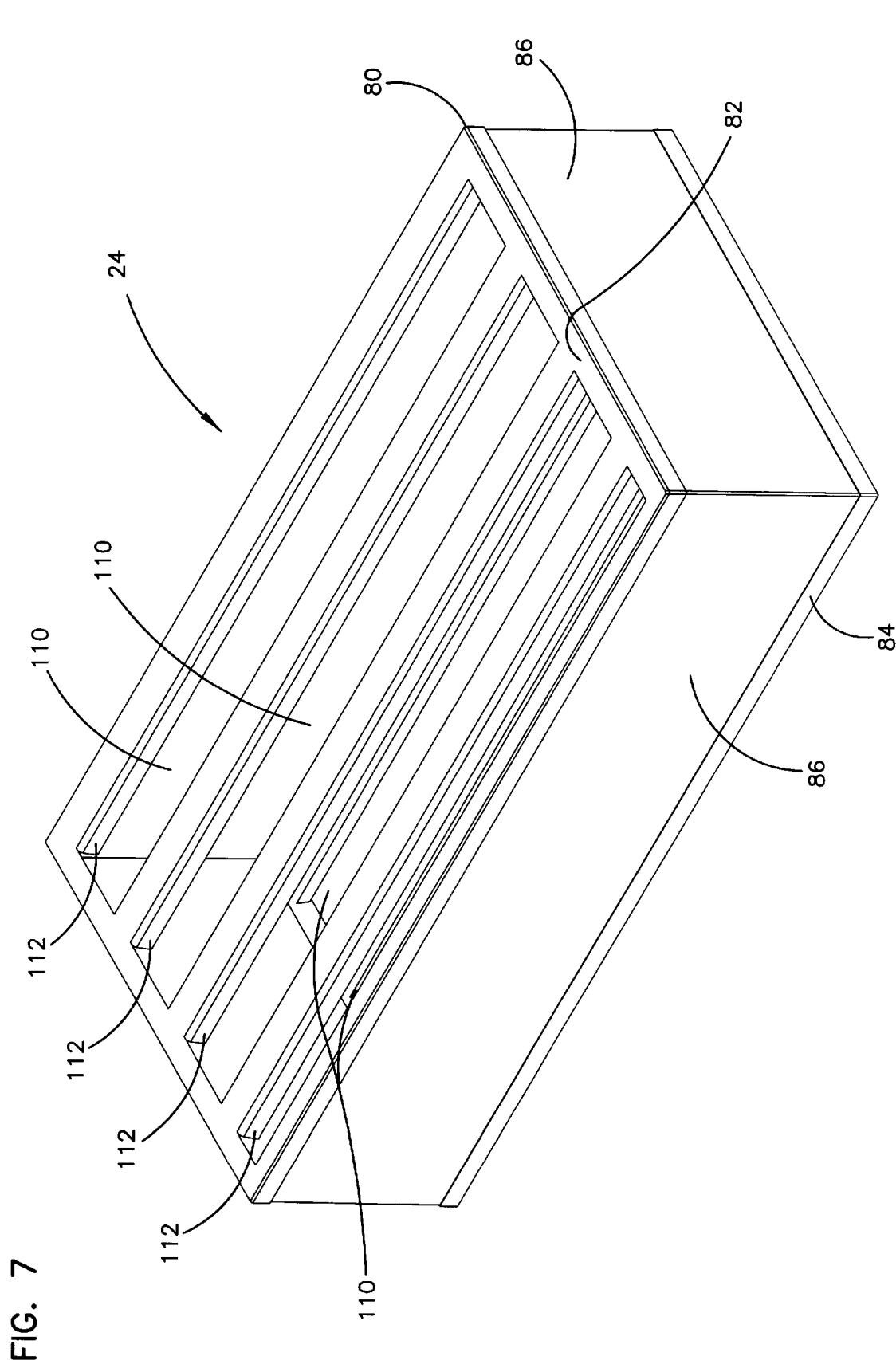
FIG. 7 shows a perspective view of the adsorptive bed cartridge shown in FIG. 6.

Referring now to FIGS. 6 and 7, there is shown an adsorptive bed assembly, generally designated 24. The adsorptive bed assembly 24 includes a generally rectangular housing 80. The housing 80 includes a top panel 82 having generally rectangular openings 110 formed therein and bent in flange portions 112 extending into the openings 110 providing a planar upper surface. Similarly, a bottom panel 84 includes a plurality of openings 110 having bent in flange portions 112. The openings 110 define inlets and outlets for the adsorption bed assembly 24. It can be appreciated that the top and bottom panels 82 and 84 have a planar sealing surface, as explained hereinafter. The housing 80 also includes rectangular sides 86 which are sealed to the top and bottom panels 82 and 84. Typical sizes of housings 80 are 12×6×24 inches or 18×8×30 inches. As shown in FIG. 6, within the housing are a plurality of adsorption layer segments 90 disposed in a V-type angled configuration that aids in providing a smaller footprint. This configuration provides for distributing flow evenly through the various segments 90 within the housing 80, as shown by the flow arrows. The configuration of the adsorption layer elements 90, in addition to the baffle arrangement and plenum ratios provides for substantially even distribution to each segment 90 in the entire adsorptive filtering system 20 and therefore balanced deterioration of each segment 90. This provides for increased system life and for changing elements as they become spent at the same interval.

Each adsorptive layer element 90 includes a granular bed of adsorptive material 92, such as activated carbon. Other suitable substances for the bed 92 of adsorption granules include zeolites, sodium bisulfate, silica or other media. The granules in the bed 92 are tightly packed to force contact with air flow through the bed. In this manner, the adsorptive bed 24 can filter out airborne contaminants such as airborne organic bases, ammonia, amines and N-methyl 12-pyrrolidone. These contaminants often cause defects in the sensitive semiconductor manufacturing processes. In a preferred embodiment, it has been found that the width of the bed 92 should be at least ten times the mean particle diameter of the granules in the bed 92. In a thin embodiment, the bed 92 is approximately 0.44 inches thick and in a thick embodiment, the bed 92 is approximately 1.1 inches thick. Typical mean diameter of the granules in the bed 92 of activated carbon is 0.044 inches in a thin embodiment and 0.06 inches in a thick embodiment. This ensures that satisfactory removal of contaminants is achieved and that particles cannot pass through the adsorption bed 24 without sufficient contact for removal.

The granular bed 92 is maintained between mesh screens 94 which are substantially rectangular in shape. Around each of the screens 94 is a C-channel type frame 100. The frame 100 is potted to the sides 86 of the adsorption bed assembly housing 80 for an improved seal. Sealant 114 provides sealing to the top and bottom panels 82 and 84 respectively, as shown in FIG. 8.

In addition, each adsorption layer element 90 has associated pre-filter panels 96 and post-filter panels 98. The panels 96 and 98 are generally electrostatic type filters or other filters and are generally rectangular in shape and are placed against the faces of the adsorption layer elements. The pre-filter 96 removes air borne particles prior to engaging the granular bed 92 and the adsorption media and retains any dust from the adsorptive material inside the filter during shipping, handling and filter replacement. The post-filter 98 ensures that any residual particles from the adsorption layer element 90 is filtered before passing to the outlet 32.

Figure 8:
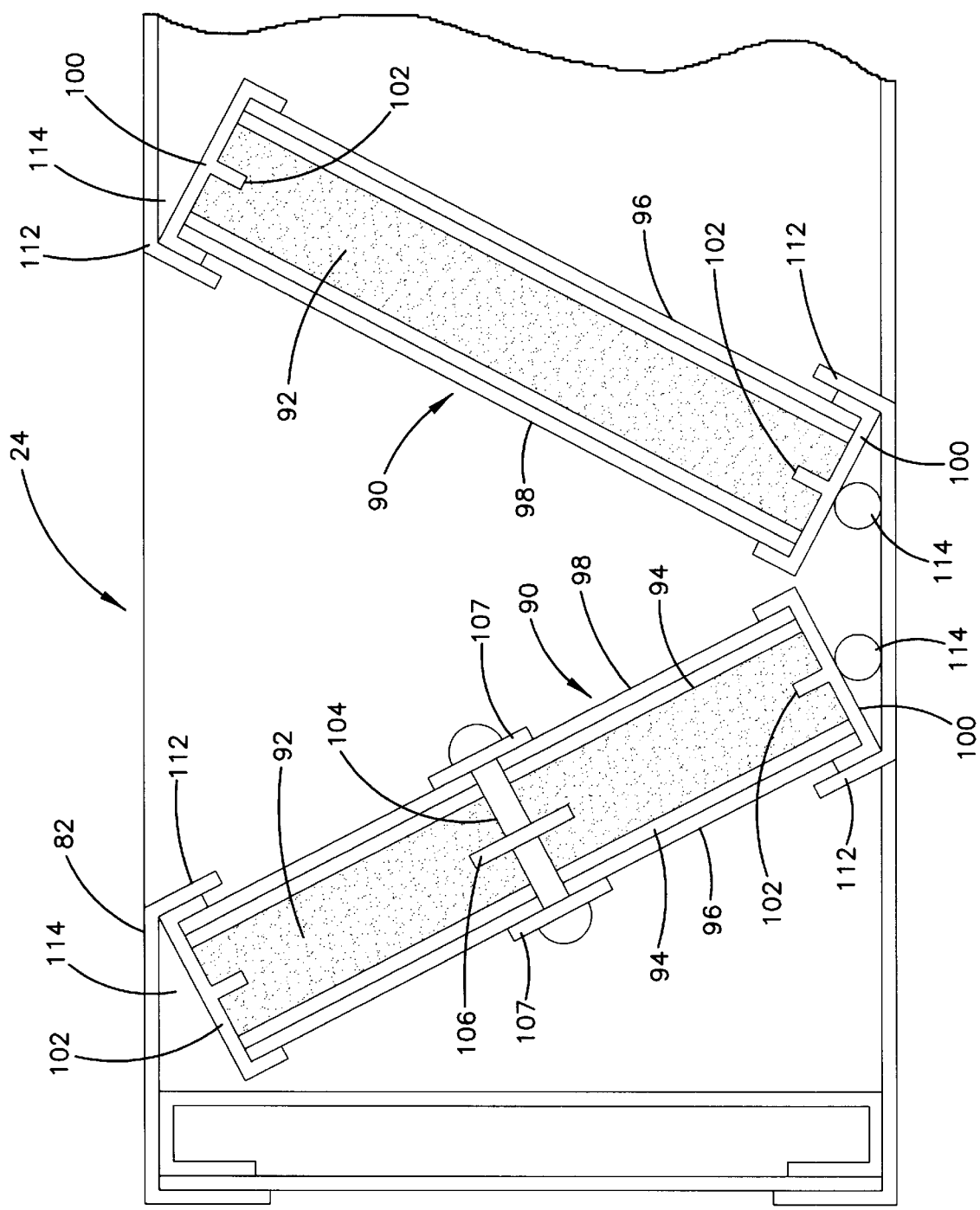
FIG. 8 shows a side sectional view of a self-contained adsorptive bed element.

Referring now to FIG. 8, there is shown a sectional view of an adsorption layer element 90. The adsorption layer element 90 includes a very tightly packed granular bed 92. It can be appreciated that although flow through the center of the bed 92 encounters little effect from the sides, near the edges of the bed 92, and against the frame channel members 100, there are voids formed due to the planar surface proximate the round or unevenly shaped granules from the bed 92. The curving surfaces of individual granules cannot fill all voids against the planar edges. It can be appreciated that filtering efficiency may be decreased as the contaminant gases may be able to proceed through the granular bed 92 with less contact against the individual granules. It has been found that by increasing the length of the path along the edges of the bed 92, the filtering efficiency at the edges of the bed 92 rise. A mid-bed baffle 102 may be placed along the edge of the bed 92 extending inward from the C-channel 100. The increased length of the journey of a contaminant ensures greater exposure to the granular bed 92 and greater filtering efficiency.

In addition, a center post 104 may be added extending between the mesh screens 94. It can be appreciated that under pressure, the screens 94 may bow outward and resettling of the granules of the bed 92 may occur leading to less efficiency. To maintain the screens 94 at their normal substantially planar configuration, a center post 104 is added which may include a retaining washer 107 engaging the outer periphery of each of the mesh screens 94. As there may be some edge effects from the center post 104, a mid-bed flange acting as a baffle 106, may be used with the center post. This configuration ensures a longer journey of particles along the post 104 to overcome the possibility of effects from voids. It can also be appreciated however that as washers 106 tend to direct some of the flow away from the post, such a center post baffle 106 may not be necessary.

In addition to retaining the screens, a compression member may be utilized at one end of the adsorption element 90 to press inward against the granular bed 92 and ensure that a tightly packed arrangement is maintained. It can also be appreciated that the adsorption bed assemblies 24 may be refillable, as one of the end panels of the sides 86 may be removable. The individual elements 90 may be replaced or the spent medium in the granular bed 92 may be emptied and active medium replaced. It can also be appreciated that a compression member, well known in the art, may be added to a removable end cap in a refillable adsorption bed assembly.

Figure 11:
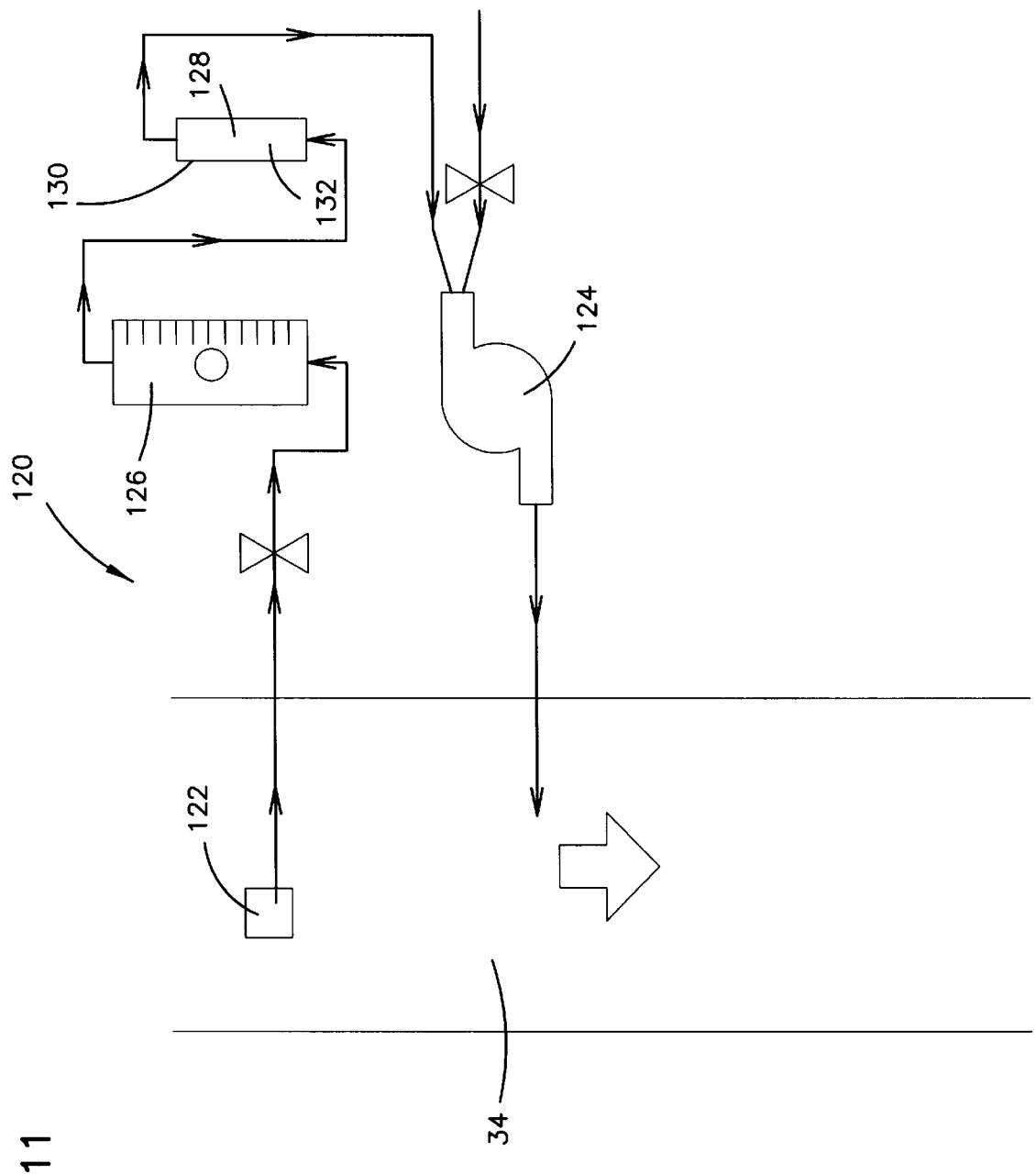
FIG. 11 shows a diagrammatic view of an indicator system for detecting airborne organic bases.

Referring now to FIG. 11, there is shown an indicator system 120 for detecting airborne contaminants. It can be appreciated that with the present invention, it is advantageous to monitor the deterioration of the active adsorption medium in the granular bed 92. Therefore, a sampling system may be used which predicts the deterioration of the medium. It can be appreciated that as the adsorption elements 90 become spent, there is no visual or other indication that the filter elements are spent. Moreover, as the contaminant does not actually leave particles which may cause a change in flow or pressure, pressure monitoring systems used with conventional particle filters cannot be used. It can be appreciated that by utilizing an indicator system which has a deterioration rate proportional to that of the adsorption bed assembly, an indicator can predict the life of the adsorption bed assemblies and when a change should be made. The system 120 uses a probe 122 upstream of the adsorption filters. The system includes a pump 124 such as an ejector type pump to maintain flow. An example of a suitable pump 124 is Model No. E-79700-00, available from Cole-Parmer Company. The indicator system 120 has a sample flow that is proportional to the flow through the adsorption bed assemblies 24. To facilitate this, a flow meter 126 having a valve is utilized which may be used to calibrate this system to obtain the desired flow rate. It can be appreciated that by changing the flow through the system, faster or slower rates of deterioration of the indicator 120 can be accomplished. Therefore, safety margins may be changed to meet the requirements of each adsorption system 20.

The indicating system 120 also includes an indicator 128 including a tube 130 containing granules 132. The granules 132 are preferably coated with a color changing substance that changes in response to a pH change. Therefore, as airborne contaminants which are typically bases reach the granules 132, the color of the spent granules will change. This change forms a front extending along the tube 130 which can be viewed. It can be appreciated that by monitoring the progress of the front along the tube 130, the deterioration stages of the adsorption bed assemblies 24 may be monitored. In a preferred embodiment, the sampling probe 122 is placed in the inlet plenum 34 so that untreated air is sampled. It can be appreciated that the high standards of the adsorptive filtering requirements of the present invention negate the use of a downstream indicator which detects contaminants once they have passed through the adsorptive filtering system 20. The delicate nature of the processes require that the adsorptive filters 24 cannot have a failure and must be changed prior to being completely spent, rather than immediately thereafter. Therefore, sampling of the air prior to treatment provides a satisfactory safety factor and an accurate predictor of the deterioration rate and life of the adsorption layer elements 90. For easy monitoring, the indicator is placed on the exterior of the door 38 of the counter flow adsorption module 22.

Operation

To facilitate effective treatment of the contaminated air, the adsorptive system 20 receives fully operational adsorptive bed assemblies 24. It can be appreciated that by opening the access door 38, as shown in FIG. 1, the self-contained cartridge-type adsorptive bed assemblies 24 may be slid into the corresponding frame sections 50 through the opening formed in the front face 140 of each frame section 50. The adsorption bed assemblies 24 rest on the supports 54 and are below the flange 70. It can be appreciated that the inflatable sealing gasket 160 extends downward from the flange 70 substantially around the periphery of the rectangular adsorption bed assembly 24. In the uninflated state as shown in FIG. 9, the gasket 160 does not engage the upper panel 82 of the adsorption bed assembly housing 80. However, once the adsorption bed assemblies 24 have been inserted, compressed air is delivered to the gaskets 160 and the inflatable tubing is expanded to the configuration shown in FIG. 10 and is forced downward to engage the top panel 82 of the assembly housing 80. As the top panel 82 has a substantially planar surface, the seal between the gasket 160 and the adsorption bed assembly housing 80 is uninterrupted, as no corners or other irregularities are encountered. Once the gasket 160 is inflated, the downstream clean air side of the filtering system is sealed from the upstream side. Following insertion of the adsorption bed assemblies 24, the indication system 120 is calibrated to achieve the proper flow rate.

When air enters the system, it passes in the top of each module 22 through the inlet 30 to the inlet plenum 34. As explained above, the ratio of the cross sectional area of the inlet plenum 34 to the outlet plenum 36 provides balanced distribution between the various adsorption bed assemblies 24. Flow passes through each assembly 24 through the associated inlet register 60 on the front face 140 of the associated frame section 50. The flow encounters an upper face of one of the baffles 28, which is angled upward and directs flow through the honeycomb panel 56 into the adsorption bed assembly 24. The inlet chamber 150 has a volume which provides for substantially balanced distribution from front to rear along the adsorption bed assemblies 24. Once the flow passes through the honeycomb panel 56, the flow is directed in a substantially straight pattern upward. The adsorption layer elements 90 are angled at approximately ten degrees from vertical and receive even flow distribution, as indicated by the arrows in FIG. 6. The treated air continues to pass upward until engaging a lower face of the baffle 28 above the assembly 24 which directs the air from the outlet chamber 152 through the register outlet 62 at the rear face 142 of each frame section 50. It can be appreciated that the baffle between vertically adjacent frame sections 50 and adsorption bed assemblies 24 acts both to direct flow upward into the adsorption bed assembly 24 above the baffle 28 and also directs air from the adsorption bed assembly 24 below the baffle 28 outward. This decreases the overall height of the frame 26 and stack of adsorption bed assemblies 24. The filtered flow then passes to the outlet plenum 36 and up through the outlet 32.

When the indicator system 120 signals changing of the adsorption medium 92, the system is taken off line. The access door 38 is opened to provide access to all the cartridge-like adsorption bed assemblies 24. The compressed air supply to the gaskets 160 is stopped and the gaskets 160 deflate to the position shown in FIG. 9. At this time, the gaskets 160 do not engage to the top panel 82 of the adsorption bed assemblies 24. The adsorption bed assemblies 24 may then be slid forward through the opening formed in the front face 140 of each frame section 50 and taken out through the access door 38. New adsorption bed assemblies 24 may be inserted in their place and the inflatable gasket 160 reinflated. In addition, the indicator 128 may be replaced so that monitoring may continue which coincides with the newly received adsorption bed assemblies.

It can be appreciated that with the present invention, parallel flow is maintained with a system that has substantially self balancing flow to each adsorption bed assembly and to each adsorption bed element 90 within each assembly 24. Such a flow pattern ensures that deterioration is constant among all elements 90. This avoids problems such as occur with non-balanced systems wherein one element 90 becomes spent earlier than predicted or earlier than remaining elements. Such lack of balanced flow distribution can lead to changing of non-spent elements prior to the required time or failure of the system, which can be costly and damaging.

In addition, the system also provides for a filtration system with a much smaller footprint and with less size. Footprint savings of forty percent (40%) are possible as compared to prior systems, such as the Osendorf system of U.S. Pat. No. 5,290,345. Such a savings is made without loss of efficiency or filter media volume. In addition, flow and pressure drop are substantially the same for the reduced system volume.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An adsorption apparatus, comprising:
a housing including an inlet and an outlet, and defining an inlet plenum extending vertically;
a plurality of adsorption bed assemblies in a vertically stacked configuration and in fluid communication with the inlet plenum;
an access door proximate the inlet plenum for inserting and removing the plurality of adsorption bed assemblies through the inlet plenum; and
a seal member between each of the plurality of adsorption bed assemblies and the housing.

2. An adsorption apparatus according to claim 1, further comprising a baffle for directing air flow from below each of the adsorption bed assemblies and up through each of the adsorption bed assemblies.

3. An adsorption apparatus according to claim 1, further comprising a baffle intermediate each adjacent two of said plurality of adsorption bed assemblies.

4. An adsorption apparatus according to claim 3, wherein said each adjacent two of said plurality of adsorption bed assemblies includes an upper adsorption bed assembly and a lower adsorption bed assembly; the baffle being constructed and arranged to direct flow upward into the upper adsorption bed assembly and to direct flow from the lower adsorption bed assembly.

5. An adsorption apparatus according to claim 4, wherein said seal member engages an upper surface of each of the adsorption bed assemblies.

6. An adsorption apparatus according to claim 5, wherein the seal member comprises an inflatable gasket.

7. An adsorption apparatus according to claim 6, wherein each of the upper surfaces of each of the adsorption bed assemblies defines a planar sealing surface.

8. An adsorption apparatus according to claim 1, further comprising a contaminant sensor for sensing a contaminant in the inlet plenum.

9. An adsorption apparatus according to claim 1, wherein each adsorption bed assembly of said plurality of adsorption bed assemblies has a plurality of adsorption elements having a layer of adsorption medium, and wherein the width of the layer of adsorption medium is no less than ten times the mean diameter of granules of the adsorptive medium.

10. An adsorption apparatus according to claim 9, wherein the adsorption elements have a V-shaped cross-sectional configuration.

11. An adsorption apparatus according to claim 1, wherein the access door comprises a single door.

12. An adsorption bed cartridge comprising:
(a) a plurality of adsorption elements; each of said adsorption elements including:
(i) first and second, opposite screens;
(ii) adsorption media packed between said first and second, opposite screens;
(iii) a first C-shaped frame member defining a channel and supporting said first and second screens;
(iv) a baffle member having an edge extending from the channel formed by the first C-shaped frame member; said baffle member being between said first and second, opposite screens; said baffle member edge extending into said adsorption media; and
(b) a cartridge housing defining an interior, at least one inlet opening, and at least one outlet opening;
(i) said plurality of adsorption elements being positioned within said cartridge housing interior.

13. An adsorption bed cartridge according to claim 12 wherein:
(a) each of said adsorption elements has first and second, opposite ends, and a second C-shaped frame member defining a channel; said first and second frame members being at said first and second opposite ends of each of said adsorption elements;
(i) each of said second C-shaped frame members including one of said baffle members projecting therefrom and extending into said adsorption media.

14. An adsorption bed cartridge according to claim 13 wherein:
(a) each of said adsorption elements includes a retaining member extending between said screens remote from said first and second frame members.

15. An adsorption bed cartridge according to claim 14 wherein:
(a) said adsorption elements are configured in a V-shape.

16. An adsorption bed cartridge according to claim 15 wherein:
(a) each of said adsorption elements is oriented at an angle about 10 degrees from a vertical axis.

17. An adsorption bed cartridge according to claim 16 wherein:

(a) said adsorption media comprises carbon granules.

18. An adsorption bed cartridge according to claim 13 wherein:

(a) each of said baffle members is positioned about midway between a respective pair of said first and second opposite screens.

* * * * *